United States Patent [19]

Asada et al.

[11] Patent Number: 4,706,143
[45] Date of Patent: * Nov. 10, 1987

[54] ROTARY HEAD CYLINDER DEVICE WITH FLUID BEARING

[75] Inventors: Takafumi Asada, Hirakata; Cyuryo Yoshida, Amagasaki; Tadao Shioyama, Sakurai; Kazuyoshi Kurose, Kitakatsuragi, all of Japan

[73] Assignee: Matsushita Electric Industrial Co., Ltd., Osaka, Japan

[*] Notice: The portion of the term of this patent subsequent to Nov. 10, 2004 has been disclaimed.

[21] Appl. No.: 619,143

[22] PCT Filed: Sep. 30, 1983

[86] PCT No.: PCT/JP83/00322
§ 371 Date: May 30, 1984
§ 102(e) Date: May 30, 1984

[87] PCT Pub. No.: WO84/01465
PCT Pub. Date: Apr. 12, 1984

[30] Foreign Application Priority Data

Sep. 30, 1982 [JP] Japan ................ 57-172722

[51] Int. Cl.[4] .................. G11B 5/52; G11B 21/04; G11B 15/61
[52] U.S. Cl. .................. 360/107; 360/84; 360/108; 360/130.74
[58] Field of Search .......... 360/84, 85, 107, 108, 360/102, 130.22–130.24; 384/99, 100, 107, 109, 115, 120, 121, 123, 111–113

[56] References Cited

U.S. PATENT DOCUMENTS

| 3,420,583 | 1/1969 | Hirs .................. 384/113 |
| 3,494,674 | 2/1970 | Muijderman et al. ....... 384/113 |
| 4,099,210 | 7/1978 | Dolby .................. 360/108 |
| 4,347,536 | 8/1982 | Miyashita et al. ........ 360/107 |
| 4,408,239 | 10/1983 | Ushiro ................ 360/107 |
| 4,487,514 | 12/1984 | Mori .................. 384/113 |

FOREIGN PATENT DOCUMENTS

| 53-130005 | 11/1978 | Japan ............ 360/130.24 |
| 55-163320 | 12/1980 | Japan ............ 384/123 |
| 56-19521 | 2/1981 | Japan ............ 360/84 |
| 57-198531 | 12/1982 | Japan ............ 360/130.24 |
| 58-134218 | 8/1983 | Japan ............ 384/121 |
| 0471605 | 5/1975 | U.S.S.R. ............ 360/84 |

OTHER PUBLICATIONS

Chironis, "New Data on Gas Bearings", Product Engineering, Dec. 7, 1964.

Primary Examiner—Stuart N. Hecker
Assistant Examiner—Benjamin E. Urcia
Attorney, Agent, or Firm—Wenderoth, Lind & Ponack

[57] ABSTRACT

A rotary head cylinder device with a fluid bearing having a lower cylinder, a fixed shaft supported at its bottom in a cantilever way, a sleeve rotatably fitted on the shaft and cylindrical rotary transformers arranged coaxially with the shaft, the shaft having herringbone groove patterns formed thereon with a larger surface area of the herringbone groove pattern on the free end side of the shaft than on the fixed end side thereof, thereby providing a compact structure.

5 Claims, 7 Drawing Figures

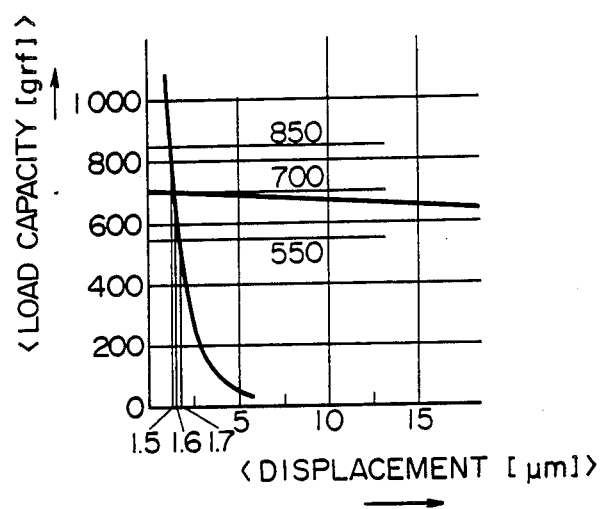
F I G. 5

ROTARY HEAD CYLINDER DEVICE WITH FLUID BEARING

TECHNICAL FIELD

The present invention relates to a rotary head cylinder device used in video tape recorders, etc., having a dynamic pressure type radial fluid bearing (hereinafter referred to as fluid bearing cylinder device) and provides a fluid bearing cylinder device which is thin and has high rotational precision, realized by utilizing cylindrical rotary transformers and by making the surface areas different between two herringbone patterns of grooves in the radial fluid bearing.

BACKGROUND ART

In the conventional fluid bearing cylinder device with its particular structure as shown in FIG. 1, a fixed shaft 2 is pressed in and secured in place at the central portion of a lower cylinder 1, a sleeve 3 is rotatably mounted on the fixed shaft 2, a thrust bearing seat 4 is screwed on the top of the fixed shaft 2 and a thrust bearing 5 is screwed on the upper end of the sleeve 3. Herringbone shaped patterns of grooves 6A and 6B are formed on the fixed shaft 2 and a spiral groove 7 is formed on the lower surface of the thrust bearing 5 by etching, etc. The space inside the bearing chamber formed between the shaft 2 and the sleeve 3 contains lubricant 8, which is oil or grease, etc., thereby comprising a dynamic pressure type fluid bearing. A rotary magnetic head 10 is mounted on an upper cylinder 9, which is mounted on the sleeve 3. Also mounted on the sleeve 3 is a disc shape rotary transformer 11 on the rotary side of the rotary head device for transmitting to the stationary side an electrical signal extracted from a magnetic tape, not shown in the drawings, through the magnetic head 10. An armature magnet 13 is supported on an armature magnet case 14 of a motor attached to a lower end of the sleeve 3, which together with the other parts mentioned above comprise a rotary side unit 20. On the other hand, inside the lower cylinder 1 is mounted a disc shape rotary transformer 12 on the stationary side of the rotary head device which receives the aforementioned electric signal. Also inside the lower cylinder 1, there is secured a motor stator 19 consisting of an iron plate 18, a printed substrate 17 and a coil 16. As the motor is energized under this state, the rotary unit 20 begins turning, producing a pressure by a pumping action of the patterns of grooves 6A, 6B and 7; then, the unit is floated up by the rising rigidity of the oil film, thereby enabling rotation of the rotary side unit 20 without making contact with the stationary side unit. Under this condition, the force of the armature magnet 13 to attract the iron plate 18 and the dead weight of the rotary side unit is exerted in the direction of arrow B as shown in FIG. 1, while a force opposing them is produced in the direction of arrow A as shown in this figure by the pumping action of the spiral groove 7. These forces are balanced and, as a result, the rotary side unit is rotated in a stable condition at a specified height.

With such a structure as described above, the rotary transformers 11 and 12 are in a disc shape, resulting in a thick fluid bearing cylinder device as a whole. Moreover, as shown in FIG. 2, when this device is tilted sideways by 90 degrees, the stationary shaft 2 tends to warp, causing a shift in the relative positions between the magnetic head 10 and the magnetic tape 60, thus interfering with normal play back, etc., of a video tape recorder (hereinafter abbreviated to VTR), etc. For a portable VTR, this device was inadequate with respect to its size and performance.

DISCLOSURE OF THE INVENTION

The device of the present invention comprises a lower cylinder, a fixed shaft supported at the bottom in a cantilever way, a sleeve rotatably fitted on the fixed shaft, a thrust bearing member secured on the upper end surface of the sleeve, at least one magnetic head and a motor securely held on the sleeve, rotary transformers, and an upper cylinder fixed on the sleeve or on the lower cylinder. The free axial end surface of the fixed shaft is used as a bearing surface and two herringbone shape groove patterns are formed on the outer surface of the fixed shaft, with the surface area of the groove pattern on the free end side made larger than on the fixed end side, and the rotary transformers are formed in cylindrical shapes, whereby a fluid bearing cylinder device having a compact structure may be obtained for excellent portability.

BRIEF DESCRIPTION OF THE DRAWINGS

FIG. 5 is a graph of thrust direction versus the fluid bearing supporting force;

THE MOST PREFERABLE MODE IN EXERCISING THE INVENTION

Figure 3:
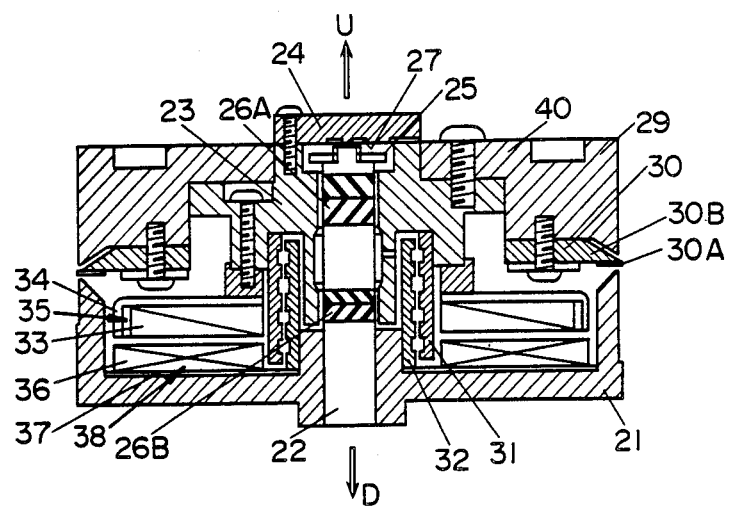
FIG. 3 is a sectional view of a first embodiment of this invention.
Figure 4:
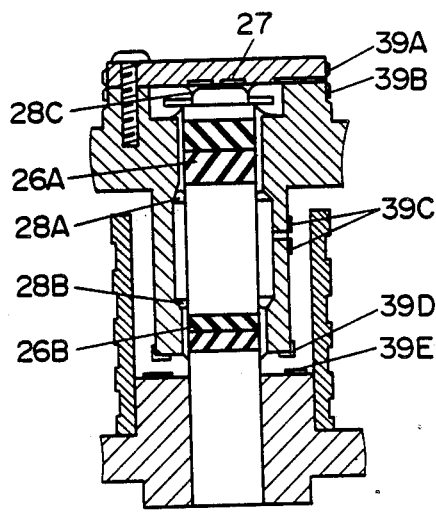
FIG. 4 is an enlarged sectional view of the fluid bearing cylinder device shown in FIG. 3.

In the following, an embodiment of this invention is described with reference to FIGS. 3~7. FIG. 3 is a sectional view of a fluid bearing cylinder device of the first embodiment of this invention. Referring to FIG. 3, 21 denotes a lower cylinder; 22, a fixed shaft pressed in or shrink fitted and secured at the central part of the lower cylinder 21, 23, a sleeve; 24, a thrust bearing fixed on the sleeve 23; 25, a ring for preventing the sleeve 23 from coming upward off the fixed shaft 22, which is secured in place on the free end of the fixed shaft 22. The reference codes 26A and 26B designate patterns of herringbone shaped grooves, which are 5~20 microns (hereinafter abbridged to μm) in depth formed by machining, etc., and 27 stands for a spiral shaped groove put in position on the lower surface of the thrust bearing 24 to abut on the upper end surface of the fixed shaft 22, which together compose a dynamic pressure type fluid bearing, filled with a lubricant 28A, 28B and 28C having a viscosity of the order of approximately 20 centipoises, and which is relatively excellent in temperature-viscosity characteristics. Numeral 29 denotes and upper cylinder which is screwed to sleeve 23, and which is provided with at least one magnetic head 30. Numeral 31 designates a rotary side cylindrical rotary transformer half, while 32 denotes a stationary side cylindrical rotary transformer half, 31 and 32 being coupled to transmit the electrical signal extracted from a magnetic tape by the magnetic head 30 to the stationary side. Numeral 33 stands for an armature magnet of a plane-to-plane type direct drive motor, which, together with a magnet case 34, constitutes a motor rotor 35. The parts 23,24,29,30,31,33 and 34 compose a rotary side unit 40. On the other hand, a coil 36 is bonded on a printed plate 37 made of iron having a printed circuit on a silicate steel plate, thereby composing a motor stator 38. Reference codes 39A~39E denote a leakage proofing agent for prevention of seepage of lubricant 28 with passage of time.

In the following, the operation of the fluid bearing cylinder device composed as hereabove-stated is described:

First, the operation of the bearing part is described. The upper surface of the fixed shaft 22 is finished flat and at a right angle to the longitudinal direction of the shaft. On the lower surface of the thrust bearing 24, a small spiral groove with a diameter at least smaller than the diameter of the fixed shaft and being on the order of approximately 4 millimeters, as shown in FIG. 3, is formed by etching, etc., so that as the rotation of the rotary side unit is started by energizing the motor, the rotary unit 40 is displaced in the direction of the arrow U by the pumping action of a lubricating liquid film of the groove 27. On the other hand, as shown in this figure, a force of the permanent magnet of the armature magnet 33, etc., to attract the printed plate 37 made of iron, is approximately 700 grams, whereas the dead weight of the rotary side unit 40, is approximately 150 grams, therefore a force totalling approximately 850 grams is exerted in the direction of the arrow D. Accordingly, when this fluid bearing cylinder device is placed in the vertical state, as shown in FIG. 3, the turning position is stabilized, being displaced by 1.5μ, as shown in a pressure-supporting force curve of FIG. 5. Then when this device is tilted sideways to 90 degrees, since the dead weight of the rotary side unit 40 is not imposed in the axial direction, only the attractive force of approximately 700 grams of the permanent magnet, such as the armature magnet 33, etc., is exerted in the direction of the arrow D. However, the small diameter spiral groove has a characteristic of undergoing a large change in load capacity with varying rates of displacement (or clearances), so that its displacement, being on the order of 1.6 μm, is barely altered from the aforementioned. Next, as this device is held upside down, the dead weight of the rotary part, 150 grams, is imposed in the direction of nullifying the 700 grams attractive force of the armature magnet 33 and, therefore, a force of approximately 550 grams, being the subtracted value, is exerted in the direction of the arrow D. Nevertheless, the displacement of the spiral groove remains in the order of 1.7 μm. As a result, very little change is observed in all cases. In this way, by balancing the first characteristic of undergoing large changes in load capacity with varying displacement due to a small diameter spiral groove with the second characteristic of undergoing no change with varying air-gaps (variation of 1~2 μm) like the attractive force of the permanent magnet which is exerted in the opposite direction thereto, the positional regulation in the axial direction can be exactly made in whatever posture. For this reason, this device is advantageous for a portable type VTR adapted for photographing in various postures.

Figure 1:
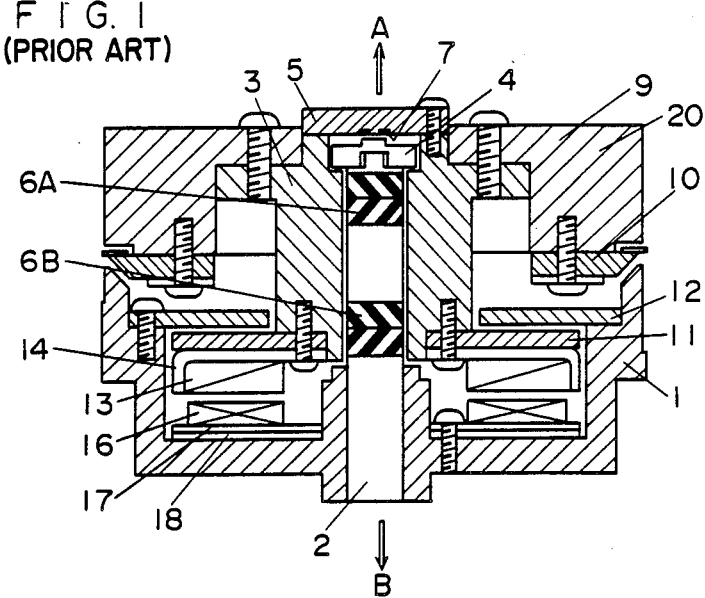
FIG. 1 is a sectional view of a conventional fluid bearing cylinder.
Figure 2:
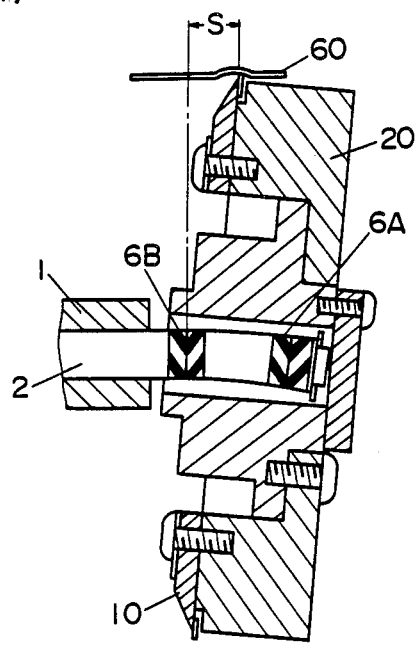
FIG. 2 is a sectional view of its principal part in horizontal posture.
Figure 6:
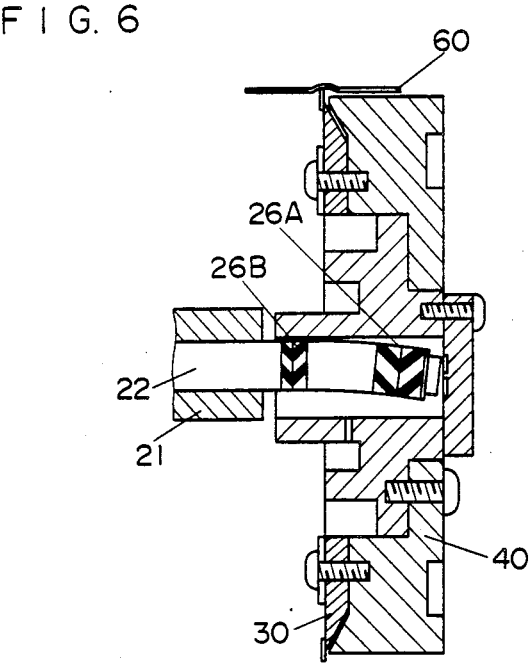
FIG. 6 is a sectional view of the principal part of the fluid bearing cylinder device of FIG. 3 in its horizontal posture.

Shown in FIG. 6 is a sectional view of part of this device being held horizontally. As shown, the length in the axial direction of the pattern of herringbone shaped grooves on the free end side of the fixed shaft 22 is longer and the length in the axial direction of the pattern of herringbone shaped grooves on the stationary side is shorter, thus providing a pattern of herringbone shaped grooves which has a larger surface area on the free end side of the fixed shaft 22. In this way, the free end of the shaft is made stronger in bearing rigidity, while the stationary side is made weaker, so that the rotary side unit 40 is kept parallel to the lower cylinder 21. In contrast, shown in FIG. 2 is a conventional fluid bearing cylinder device being tilted to its horizontal posture. In this conventional device, the rotary side unit 20 could not be kept parallel to the lower cylinder 1 due to the warping of the fixed shaft 2, so the relative position between the magnetic tape 60 and the rotary magnetic head 10 was shifted and, consequently, normal playback of the video tape recorder was impossible. In the fluid bearing cylinder of this invention shown in FIG. 6, the relative position of the magnetic head to the magnetic tape 60 is not shifted in whatever posture, permitting revolution with high precision. As described above, by the combination of a shaft 22 being a fixed shaft supported in a cantilever way and patterns of herringbone shaped grooves 26A and 26B on the fixed shaft 22 being set to appropriate surface areas, a high precision bearing is obtained, whereby a fluid bearing cylinder device is obtained which has excellent performance when used in a portable video tape recorder.

In the following, cylindrical rotary transformers 31 and 32 are described. According to this invention, the device as a whole is made smaller by forming the rotary transformers in cylindrical shapes. For improved performance of the rotary transformers, the distance between the rotary side 31 and the stationary side 32 needs to be very narrow. With this type of structure, the rotary transformers will come in contact with each other if they are combined with the conventional bearing and the device is tilted by 90 degrees to its horizontal posture, but by making one of the patterns of herringbone shaped grooves 26A and 26B in the aforementioned radial bearing longer, and the other shorter, the inclining of the rotary unit 40 and therefore the contacting of the rotary transformers with each other can be avoided.

By forming the rotary transformers in cylindrical shapes, the disadvantage of temporarily suspending it while assembling, as is the case in the conventional stationary side rotary transformer 12 is overcome and through a combination of fixing the shaft 22 and forming the rotary transformers 31 and 32 in cylindrical shapes, a thin and quite easy to assemble fluid bearing cylinder device can be obtained.

In addition, as the magnetic head 30 is altered in shape from the conventional magnetic head 10, a head chip 30A is secured in place on the lower surface of a head base 30B of FIG. 3 and, further, the head base 30B is so mounted on the upper cylinder side as if buried therein from the borderline between the upper cylinder 29 and the lower cylinder 21, then, the cylinder device is made further thinner and it becomes feasible to build the motor rotor 35 and stator 38 into the interior of the lower cylinder.

Figure 7:
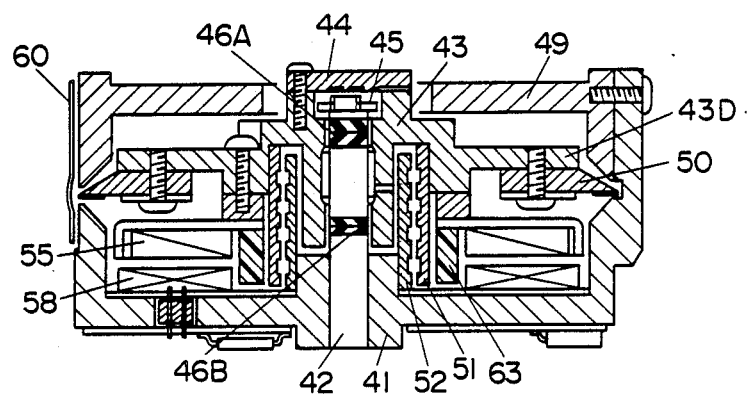
FIG. 7 is a sectional view of a second embodiment of this invention.

In the following, the second embodiment of this invention is described with reference to FIG. 7. Numeral 41 designates a lower cylinder; 42, a fixed shaft; 43, a sleeve; 44, a thrust bearing; 45, a ring; 51 and 52, cylindrical rotary transformers; and a motor rotor 55 and a motor stator 58, which comprises a plane-to-plane type motor, these parts being identical with those of the first embodiment shown in FIG. 3. The differences from the structure of FIG. 3 are that an upper cylinder 49 is secured to the lower cylinder 41 and a magnetic head 50 only is mounted on a flange part 43D of the sleeve 43. The operation of the aforementioned structure is nearly identical with that of the first embodiment, but by affixing the upper cylinder 49 to the lower cylinder 41, nearly 90% of the side pressure with which the magnetic tape 60 is pressed onto the cylinder is received by the upper and the lower cylinders 41 and 49 and only a small side pressure is imposed on the bearing. Consequently, less rigidity of the bearing is permissible. Thus, it is possible to shorten the axial direction dimensions of the patterns of the herringbone shaped grooves 46A and 46B, which diminishes the frictional moment of the bearing and, as a result, reduces the power consumption of the motor.

Also, in the second embodiment, a permanent magnet 63 is mounted coaxially with respect to the motor rotor 55 and the motor stator 58. With this arrangement it is possible to make the axial direction attraction more powerful, so that the change in the displacement rate of the spiral groove is further reduced when this cylinder device is turned upside down or sideways by 90 degrees to its horizontal posture, thereby attaining high precision rotation. It should be noted that both in the first and the second embodiments, the same effect may be obtained with the patterns of herringbone shaped grooves formed by machining, etc., on the inner circumference sleeve to be rotatably supported by the fixed, shaft, instead of on the fixed shaft.

INDUSTRIAL APPLICABILITY

By making the surface area of the pattern of herringbone grooves larger on the free end side of the fixed shaft supported in a cantilever way, and smaller on the other side, in a radial fluid bearing and by using a pair of cylindrical rotary transformers, a thin fluid bearing cylinder which is excellent in its portable operation is obtained.

We claim:
1. A rotary head device having a fluid bearing comprising:
   stationary support means;
   a shaft having one end thereof fixedly supported by said stationary support means;
   rotatable support means rotatably mounted on a free end of said fixed shaft;
   at least one magnetic head disposed on said rotatable support means;
   a cylindrical rotary transformer means mounted coaxially around said fixed shaft for transmitting an electrical signal to and from said at least one magnetic head;
   motor means for rotating said rotatable support means; and
   radial bearing means disposed between said fixed shaft and said rotatable support means for preventing shifting of said at least one magnetic head relative to a magnetic tape, said bearing means including a lubricant and a first pattern of herringbone shaped grooves on said fixed shaft or on said rotatable support means at a position near said free end of said fixed shaft and a second pattern of herringbone shaped grooves on said fixed shaft or on said rotatable support means at a position between said first pattern and said fixed end of said fixed shaft, said first pattern having a surface area larger than said second pattern to provide greater bearing rigidity in a radial direction to said free end of said fixed shaft due to the rigidity of a lubricating film between said fixed shaft and said rotatable support means when said rotatable support means is rotated relative to said fixed shaft.

2. The rotary head device of claim 1, further comprising a thrust bearing member mounted on said rotatable support means in opposed relation to said free end of said fixed shaft and a spiral shaped groove formed on either said free end of said fixed shaft or on said thrust bearing member whereby said rotatable support means is displaced away from said free end of said fixed shaft when said thrust bearing member is rotated relative to said fixed shaft.

3. The rotary head device of claim 2, wherein said motor means includes a motor rotor mounted on said rotatable support means and a motor stator mounted on said stationary support means.

4. The rotary head device of claim 1, wherein said transformer means includes a first cylindrical transformer half mounted on said rotatable support means and a second cylindrical transformer half mounted on said stationary support means, said first and second transformer halves being coaxial with said fixed shaft.

5. The rotary head device of claim 4, further including a permanent magnet mounted coaxially with respect to said motor stator and said motor rotor to thereby make the attraction between said motor stator and said motor rotor more powerful and reduce the displacement between said free end of said fixed shaft and said thrust bearing member mounted on said rotatable support means.

* * * * *